Inventor
P. White
By Glascock Downing Luhrs
Attys

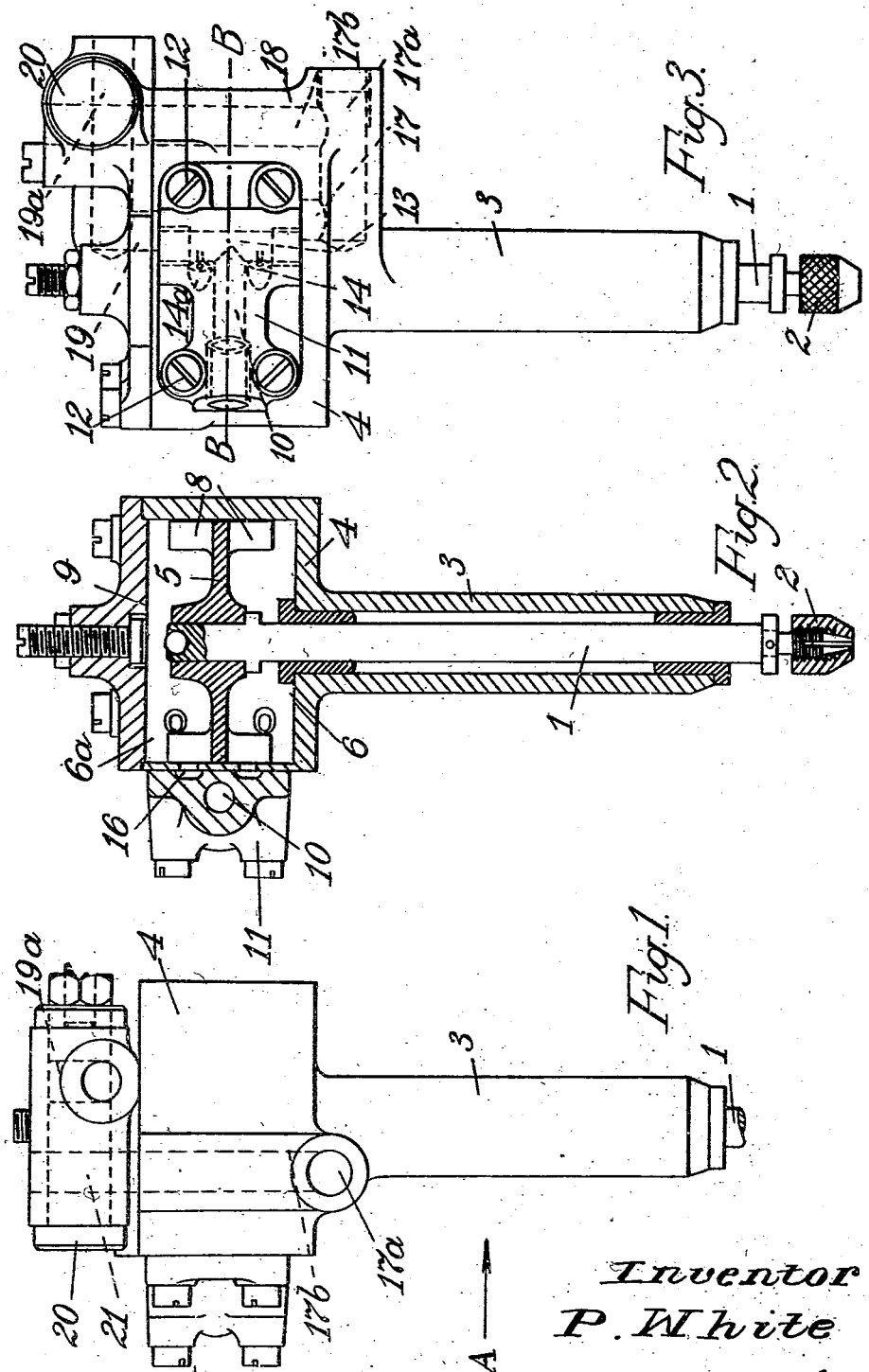

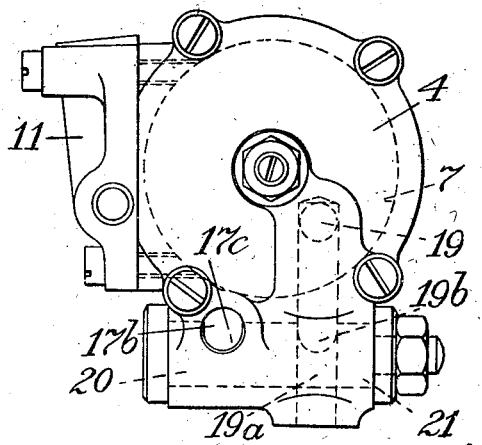
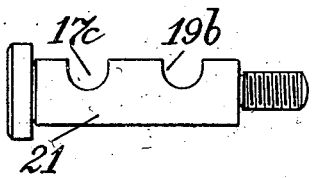
Fig.5.
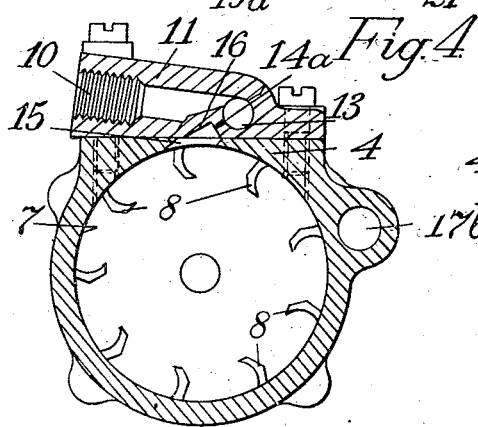
Fig.6.
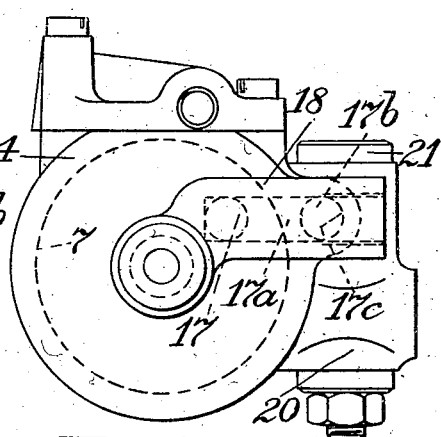
Fig.7.
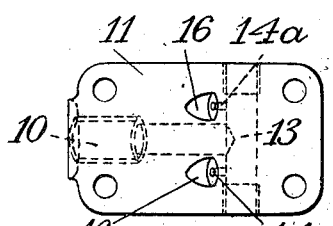
Fig.8.
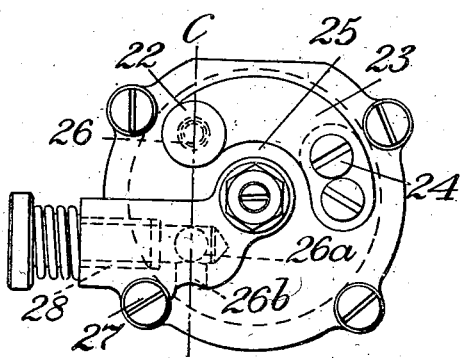
Fig.9.
Inventor
P. White Aug. 14, 1945.  P. WHITE  2,382,526
FLUID MOTOR
Filed May 31, 1944  3 Sheets-Sheet 3

Patented Aug. 14, 1945

2,382,526

UNITED STATES PATENT OFFICE 2,382,526

FLUID MOTOR

Percy White, Twickenham, England, assignor to The Automotive Engineering Company Limited, Twickenham, England Application May 31, 1944, Serial No. 538,119
In Great Britain August 12, 1943

7 Claims. (Cl. 253—2)

This invention relates to drilling machines and is concerned primarily with such drilling machines as are employed to drill holes of very small diameter such, for instance, as holes of a few thousandths of an inch in diameter.

Essential requirements of such drilling machines, that is machines for drilling very small diameter holes, are that the spindle carrying the drill should be rotated at a very high speed (e. g. 15,000 R. P. M. or more) and that a very sensitive feeding movement of the drill should be possible.

Drilling machines as at present in use for drilling very small diameter holes are adapted for a manual feeding of the drill by the operator either pressing a small lever or turning a knurled head and the objection exists, in handling such machines, that the human element enters into the obtaining of the feeding movement as it only requires a very slight increase in pressure by the operator on the control lever or head to cause the drill to fracture.

The invention has for its object to provide an improved form of drilling machine which can be employed to drill very small diameter holes and which dispenses with the necessity of relying upon the human element to maintain the required sensitive feeding movement of the drill.

The invention consists in a drilling machine or head incorporating a turbine for rotating the drill spindle and means for controlling the turbine pressure to produce the drill feeding movement of the spindle.

The invention also consists in a drilling machine or head wherein the drill spindle carries the common rotor of a pair of turbines each having its own jet and exhaust system and means is provided for restricting the exhaust from one or the other of said turbines to produce automatically a feeding or retracting movement of the drill spindle.

Figure 10:
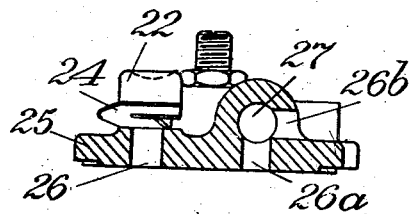
Figure 11:
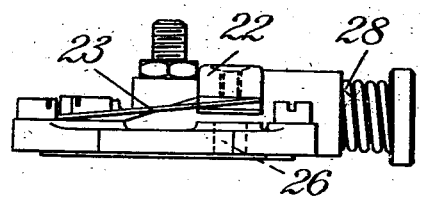
Figure 12:
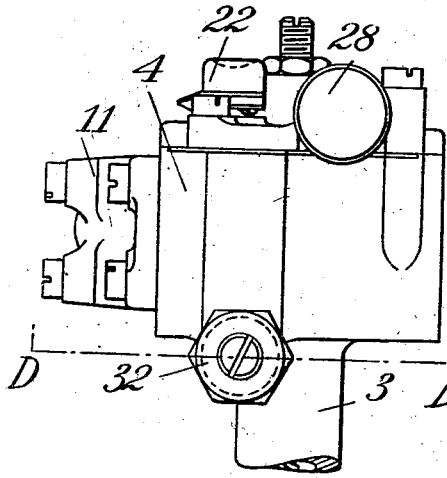
Figure 13:
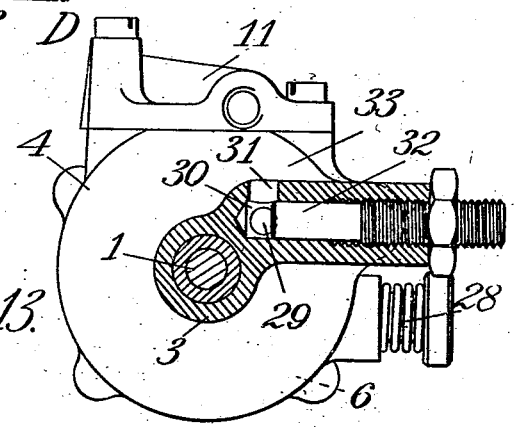

In the accompanying drawings:

Figure 1 is an elevational view of one form of drill in accordance with the invention, Figure 2 is a longitudinal section of the drill according to Figure 1, Figure 3 is an elevational view of the drill looking in the direction of the arrow A in Figure 1, Figure 4 is a top plan view of Figure 1, Figure 5 illustrates a detail, being a plug rotatable in the exhaust box of the drill to control the exhaust from the turbine chambers, Figure 6 is a section on the line B—B of Figure 3, Figure 7 is an end elevational view of the drill looking in the direction of the arrow C in Figure 2, Figure 8 is a view of a detail, being an underneath view of the block seen in Figures 3 and 6 and containing the high pressure or inlet air passages, Figure 9 is an end elevational view of a drill in accordance with the invention equipped with an alternative exhaust system which involves the use of a spring push-button valve for controlling the pressure, Figure 10 is a section on the line C—C of Figure 9, Figure 11 is a plan view of the detachable end plate of the turbine casing containing the push-button valve, Figure 12 is a side elevational view of Figure 9, and Figure 13 is a section on the line D—D of Figure 12.

In carrying the invention into effect in one convenient manner and referring first to the embodiment illustrated in Figures 1 to 8, a drilling machine or head is provided which can be employed to drill very small diameter holes and comprises a spindle 1 (Figures 2 and 3) which carries a chuck 2 at one end for the reception of the drill and is reciprocable within a concentric outer sleeve 3 which latter, at the end thereof remote from the chuck, terminates in an enlarged cylindrical casing 4 with respect to which the spindle is co-axial and in which an extension of the spindle carries, for rotation therewith, a disc 5 which extends radially from the spindle and virtually divides the interior of the said chamber into two separate compartments 6 and 6a each of which constitutes a turbine chamber, the outer periphery of the said disc having only a small working clearance with respect to the inner cylindrical surface 7 of the casing.

The turbines are conveniently of the Pelton wheel type and have their buckets constituted by vanes 8 disposed at the outer periphery of the disc on each side face thereof, the blades of each ring thereof extending parallel with respect to the central longitudinal axis of the spindle.

The said extension of the drill spindle, at the end which is located within the said casing 4, terminates short of the opposite end face 9 of the casing and the entire arrangement is such that the spindle 1, with the said disc 5 and two rings of turbine vanes 8 thereon, is free to reciprocate longitudinally relatively to the said outer sleeve 3 and casing 4 for a limited amount which exceeds, however, the depth of the hole which can be drilled by the drill.

Each set of turbine vanes is provided with its own jet and exhaust system and means is provided adapted to permit of the selective production of an increased pressure within one or the other turbine chambers 6, 6a whereby, depending upon the side on which such increase in pressure is selected to take place, the drill spindle will be moved longitudinally either forwards or backwards.

For instance if the exhaust from one or the other side of the common turbine disc 5 is restricted a pressure will be built up within the turbine chamber on that side and the rotor (constituted by said disc 5 and vanes 8) will act as a piston to move the drill spindle axially towards the opposite end. In particular, if the exhaust from the outer turbine chamber 6a, i. e. the chamber farthest from the drill, is restricted, then a thrust will be applied to the drill which is proportional to the amount of the restriction and is constant throughout the consequential axial travel of the drill.

The desired effect, that is the automatic reciprocation of the drill or spindle by a selective controlling of the pressure in the two turbine chambers, can be obtained in a variety of ways. If the effect is obtained by restricting the exhaust such restriction may, for example, be obtained by providing an ordinary type of tap, similar to a gas tap in the exhaust system, or a push button combined with an adjustable by-pass orifice could be fitted to completely close the desired exhaust outlet when the push button is depressed.

If the part controlling the restriction is fitted with an adjustable stop, then this can be set by a setter to give a pressure appropriate to the size of drill in use and which cannot thereafter be exceeded by a less skilled person who may be using the drilling machine.

Further, if the restriction is controlled by a mechanically driven device, such device can be made to oscillate the spindle at any desired speed, which would be particularly advantageous when grinding or lapping a small hole or clearing the swarf.

As a refinement it would be possible to fit a governor by which the drilling speed could be adjusted to suit different sizes of drill while maintaining the full torque of the turbine, which is not the case with the usual method of regulating the speed by altering the air pressure.

Referring to Figures 2, 3, 6 and 8 the supply of compressed air to drive the turbine rotor is supplied through a central bore 10 contained in a block 11 mounted upon the casing 4 by screws 12 and delivering into a cross bore 13 containing a pair of branch nozzles 14, 14a through which the compressed air is discharged into the turbine chambers 6, 6a respectively via pockets 16 formed in the underneath surface of the block 11 and openings 15 in the casing.

The exhaust of the air from the turbine chamber 6 takes place via a hole 17 in the adjacent end wall of the casing 4, which hole opens into a bore 17a in an exhaust box 18 which contains another bore 17b leading from the bore 17c in the valve plug but perpendicular thereto and discharging at its outer end into the atmosphere. The exhaust of the air from the other turbine chamber 6a takes place via another hole 19 in the adjacent end wall of the casing 4, and a bore 19a in the exhaust box which bore 19a discharges into the atmosphere and extends perpendicular to the aforesaid bore 17b. These two bore portions 17b and 19a terminate at their outer ends in a common bore 20 in which a plug valve 21 (Figures 4 and 5) is rotatably accommodated and contains two semi-cylindrical recesses or ports 17c and 19b corresponding to the bore portions 17b and 19a respectively and positioned within their respective bore portions. Accordingly, as the latter extend perpendicular to one another the valve plug, in one extreme position thereof, and as illustrated in Figure 4, completely closes the outlet end of the bore portion 19a and completely opens the outer end of the bore portion 17b to the atmosphere as in this position of the plug valve the semi-cylindrical recess or port 19b is disposed transversely to its bore portion 19a, so that the latter is closed by the solid plug portion behind this port, and the semi-cylindrical recess or port 17c extends parallel with its bore portion 17b and leaves the same completely open to the atmosphere. Intermediate positions of the plug provide varying pressure conditions within the turbine chambers 6, 6a.

Referring now to Figures 9 to 13 there is illustrated therein a modified exhaust system which involves the use of a spring urged push-button valve for obtaining immediate variations of pressure in the outer turbine chamber 6a and a screwed plug valve for obtaining an adjustable but set pressure condition in the other turbine chamber c.

The push button 22 is carried at the free end of a spring strip 23 which is secured at its opposite end, by screws 24, on the one end plate 25 of the drill casing 4, which end plate is detachably mounted in position and corresponds to the outer turbine chamber 6a, the exhaust from which takes place via a pair of openings 26, 26a in the said end plate. The spring strip urges the press button outwards into the position seen in Figure 11 where the exhaust opening 26 is open to the atmosphere but the arrangement is such that this opening can be immediately closed, whenever required, simply by pressing upon the press button 22 and holding the same depressed. The opening 26 is a simple opening and is normally open to the atmosphere whereas the other exhaust opening 26a for the one turbine chamber 6a is a composite opening and includes an outer opening 26b at right angles to the opening 26a and discharging into the atmosphere from an intermediate bore 27 containing a screw, and spring biassed, plug 28 by which the effective size of these exhaust openings may be varied and set to a desired amount.

The exhaust from the other turbine chamber 6 takes place via an opening 29 in the corresponding end wall 33 of the turbine casing 4, which opening 29 communicates with a bore 30 containing a branch opening 31 and fitted with a screw plug 32 which is adjustable and set (normally permanently) to give a desired pressure in this turbine chamber 6.

The invention provides a novel form of drilling machine or head therefor which eliminates the human element and permits the machine to be set once and for all by a skilled person to give the correct feeding movement automatically so that this is thereafter independent of any errors of judgment on the part of the operator.

I claim:

1. A fluid motor device comprising in combination a spindle, a turbine rotor of disc form at one end of the spindle, a set of turbine vanes disposed on each side of said rotor disc, a stationary casing in which said rotor is accommodated and which is divided thereby into two separate turbine chambers each having its own inlet and exhaust passages, the rotor and spindle being mounted in said casing for both rotary and reciprocatory movements relatively thereto, and means for varying the fluid pressure in one or the other of said chambers whereby to produce an axial movement of the spindle.

2. A fluid motor device according to claim 1 wherein each set of turbine vanes is provided with its own jet and exhaust system and means is provided adapted to permit of the selective production of an increased pressure within one or the other turbine chambers whereby, depending upon the side on which such increase in pressure is selected to take place, the spindle will be moved longitudinally either forwards or backwards.

3. A fluid motor device according to claim 1 wherein means is provided for restricting the exhaust from one of the turbine chambers so as to produce automatically a reciprocatory movement of the spindle.

4. A fluid motor device according to claim 1 wherein the exhaust passages from the turbine chambers deliver into a common bore, and a valve in said common bore which is rotatable to vary the effective size of said exhaust passages.

5. A fluid motor device according to claim 1 wherein the exhaust system of one of the turbine chambers includes a normally open exhaust opening and a spring biased press button associated with said exhaust opening and capable of being depressed to close the opening momentarily.

6. A fluid motor device comprising in combination a casing having a hollow chamber therein, a turbine rotor mounted in said chamber for both rotational and reciprocatory movement therein, a spindle carried by said rotor to extend outwardly from said chamber, the latter having inlet and exhaust openings for the propulsive fluid and means for varying the fluid pressure on one side or the other of said rotor to produce simultaneously both rotary and translational movement of the spindle.

7. A fluid motor device comprising in combination a stationary casing having a cylindrical chamber therein and extending outwardly from the centre of one side of this cylindrical chamber, a hollow tubular part coaxial with the cylindrical chamber, a spindle mounted in said tubular part to extend longitudinally thereof and coaxial therewith, the inner end of the spindle extending into the cylindrical chamber and the spindle being mounted to have both rotary and axial movement relatively to the tubular casing part, a turbine rotor secured upon the inner end of the spindle to extend transversely across the cylindrical chamber and divide the latter into two separate compartments located one on each side of the rotor, the latter having blade means on each side thereof and each said compartment having its own fluid inlet and exhaust openings and means for varying the fluid pressure in one or the other of the said compartments to produce an axial movement of the spindle in the required direction.

PERCY WHITE.